Oct. 24, 1950     C. E. JOHNSON ET AL     2,527,133

GAFF HOOK

Filed June 1, 1948

CHARLES E. JOHNSON
GEORGE O. JOHNSON
INVENTORS

BY James D. Girvan
ATTY

Patented Oct. 24, 1950

2,527,133

UNITED STATES PATENT OFFICE 2,527,133

GAFF HOOK

Charles E. Johnson and George O. Johnson, Portland, Oreg.

Application June 1, 1948, Serial No. 30,457

1 Claim. (Cl. 294—110)

This invention relates to improvements in gaff hooks of the type generally used by fishermen for hooking and lifting a caught fish out of the water.

It is one of the principal objects of the invention to provide a gaff hook consisting of a pair of hooks swingably mounted by their shanks to a common pivot point and spring actuated from a wide open to a closed position when struck against a fish. When the hooks are snapped into a closed position, their points overlap and are so held by a locking mechanism to prevent a fish from disengaging itself from the hooks.

A further object of the invention is the provision of means for regulating the sensitivity of the tripping of a trigger mechanism for closing the hooks.

These and other objects will appear as our invention is more fully hereinafter described in the following specification, illustrated in the accompanying drawings, and finally pointed out in the appended claim.

Figure 1:
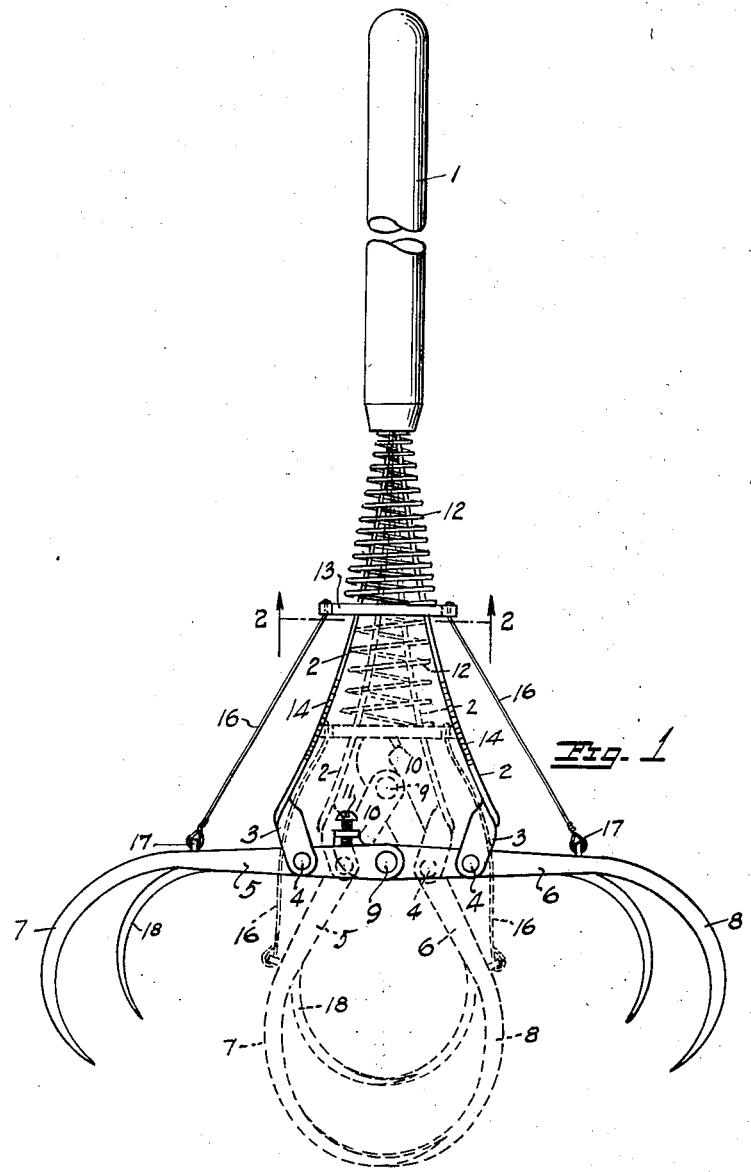
Figure 1 is a front elevation of a gaff hook made in accordance with our invention and shown in an open position in full lines and in a closed position in dotted lines.
Figure 2:
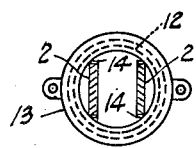
Figure 2 is a sectional end elevation taken approximately along the line 2—2 of Figure 1.

Referring now more particularly to the drawing:

In Figure 1, reference numeral 1 indicates a handle which may be of any desired length and bored inwardly from one of its ends to receive a pair of spring arms indicated at 2. The spring arms are secured to the handle by any suitable means, such, for instance, as a ferrule, countersunk rivets or the like. The outer ends of the spring arms are turned at right angles to themselves as at 3 and pivotally connected as at 4 to shanks 5 and 6 of a pair of cooperating hooks indicated at 7 and 8, respectively. The top ends of the hook shanks are pivotally connected to each other as at 9. The top end of the hook shank 6 is extended and turned outwardly on itself as at 10 to receive a setscrew 11 to form an adjustable limit stop for aligning the hook shanks with respect to each other in an open position and to the pivot point 9 for regulating the sensitivity of the tripping action of the hooks. For example, when the shanks are in alignment with each other, as shown in full lines in Figure 1, a minimum amount of pressure is required between the pivot points 4 to start the pivot point 9 on its upward movement at which instant the action of the spread apart spring arms 2 are applied to the shanks of the hooks to snap them into a closed position. If, however, the setscrew 11 is retracted on its threads sufficiently to cause the shanks of the hooks to diverge upwardly out of alignment with each other, a greater amount of pressure will be required to swing the hook shanks around the pivot point 9 into a position to be actuated by the spring arms.

For locking the hooks in a closed position, as shown in dotted lines in Figure 1, we provide a compression spring 12 which surrounds the spring arms and whose one end bears against the end of the handle and whose opposite end is attached to a locking ring 13 which slidably embraces the spring arms and moves forward or downwardly therealong by the action of the spring when the hooks are moved into a closed position and the spacing between the outer ends of the spring arms is reduced. To prevent displacement of the ring 13 or its unintentional rearward or upward movement along the spring arms, we serrate the top and bottom edges of the spring arms as at 14. The purpose of the ring is to prevent spreading of the spring arms and the resultant opening of the hooks by the action of a fish in its attempt to free itself.

To spring load the hooks or, in other words, to set them in an open position, it is merely necessary to draw the ring 13 rearwardly along the spring arms to allow freedom of their spreading action as the hooks are drawn outwardly about their pivot points 9 and 4 into the full line positions shown in Figure 1.

For convenience in spreading the hooks into a spring-loaded open position, we connect the ring 13 by a pair of flexible cables or chains 16 with the hook shanks 5 and 6 as at 17. By this arrangement the hooks may be quickly and conveniently opened by a single handed operation. This is an important feature since obviously a fisherman having a fish hooked on a line handled by one hand must necessarily be able to actuate the hook with his other hand.

It is to be understood that we may provide any number of auxiliary hooks 18 formed integral with the hook shanks intermediate their ends for dealing with fish of various sizes.

While we have shown a particular form of embodiment of our invention, we are aware that many minor changes therein will readily suggest themselves to others skilled in the art, without departing from the spirit and scope of the invention. Having thus described the invention, what we claim as new and desire to protect by Letters Patent is:

A gaff hook of the class described comprising in combination an elongated solid handle, a pair of spring arms secured to one end of the handle and diverging outwardly therefrom, a pair of hooks having shank portions pivotally connected to the ends of said spring arms and pivotally connected to each other intermediate their said pivotal connections with said spring arms, whereby pressure applied to said shanks between their said pivotal connections with said spring arms will mis-align said shanks into positions to be acted upon by the spring arms for closing the hooks into overlapping relation to each other, a set screw carried by the shank of one hook for adjustable contact with the shank of the other hook to vary the amount of pressure required for mis-aligning said hook shanks for actuation by said spring arms, a ring slidably embracing said spring arms and connected with said hook shanks by flexible cables, said spring arms being serrated along their edges for engagement with said ring, and a coil surrounding the spring arms for urging said ring into engagement with said serrations.

CHARLES E. JOHNSON.
GEORGE O. JOHNSON.

REFERENCES CITED

The following references are of record in the file of this patent:

UNITED STATES PATENTS

| Number | Name | Date |
|---|---|---|
| 168,335 | Jincks | Oct. 5, 1875 |
| 1,187,193 | Smith | June 13, 1916 |

FOREIGN PATENTS

| Number | Country | Date |
|---|---|---|
| 13,912 | Great Britain | 1898 |